United States Patent
Takei et al.

(10) Patent No.: US 8,238,049 B2
(45) Date of Patent: Aug. 7, 2012

(54) LENS DRIVE DEVICE

(75) Inventors: Hiromitsu Takei, Nagano (JP); Takeshi Sue, Nagano (JP); Yukio Furuya, Nagano (JP)

(73) Assignee: Nidec Sankyo Corporation (JP)

( * ) Notice: Subject to any disclaimer, the term of this patent is extended or adjusted under 35 U.S.C. 154(b) by 0 days.

(21) Appl. No.: 13/031,874

(22) Filed: Feb. 22, 2011

(65) Prior Publication Data
US 2011/0205648 A1 Aug. 25, 2011

(30) Foreign Application Priority Data

Feb. 22, 2010 (JP) ................................. 2010-035537

(51) Int. Cl.
*G02B 7/02* (2006.01)
*G02B 15/14* (2006.01)
(52) U.S. Cl. ....................................... 359/824; 359/694
(58) Field of Classification Search .................. 359/814, 359/694, 824
See application file for complete search history.

(56) References Cited

U.S. PATENT DOCUMENTS
2010/0188761 A1* 7/2010 Wade et al. ................... 359/824

FOREIGN PATENT DOCUMENTS
JP 2008-191332 A 8/2008

* cited by examiner

*Primary Examiner* — James Jones
(74) *Attorney, Agent, or Firm* — Cantor Colburn LLP

(57) ABSTRACT

A lens drive device formed in a substantially quadrangular shape may include a movable body holding a lens, a fixed body movably holding the movable body, and a drive mechanism for driving the movable body in the optical axis direction. The drive mechanism may include first drive magnets respectively disposed on four side faces of the lens drive device, a second drive magnet for restraining inclination which is disposed on at least one of four corners of the lens drive device, and a drive coil which is wound around in a substantially octagonal shape. Magnetic flux passing through the drive coil at one of the four corners of the lens drive device is different from magnetic fluxes passing through the drive coil at the other three corners, or magnetic fluxes passing through the drive coil at two corners adjacent to each other of the four corners of the lens drive device are different from magnetic fluxes passing through the drive coil at the other two corners.

16 Claims, 6 Drawing Sheets

LENS DRIVE DEVICE

CROSS REFERENCE TO RELATED APPLICATION

The present invention claims priority under 35 U.S.C. §119 to Japanese Application No. 2010-35537 filed Feb. 22, 2010, the entire content of which is incorporated herein by reference.

FIELD OF THE INVENTION

At least an embodiment of the present invention may relate to a lens drive device.

BACKGROUND

Conventionally, as a lens drive device for driving a photographing lens of a camera mounted on a cellular phone or the like, a lens drive device has been known which is provided with a holder that holds a lens and is moved in an optical axis direction and a drive coil and a drive magnet for driving the holder in the optical axis direction (see, for example, Japanese Patent Laid-Open No. 2008-191332). In the lens drive device described in this Patent Literature, the drive coil is wound around in an octagonal shape when viewed in the optical axis direction. Further, the lens drive device is provided with eight drive magnets formed in a plate shape and the eight drive magnets are respectively disposed to face outer faces of respective sides of the drive coil which is wound around in the octagonal shape when viewed in the optical axis direction.

In recent years, in a market of a camera which is used in a cellular phone or the like, requirement for a high pixel density has been further increased and, in order to meet the requirement for a high pixel density, a permitted range of a variation quantity of inclination (tilt variation quantity) of an optical axis of a lens mounted on a camera has become smaller.

SUMMARY

In view of the problem described above, at least an embodiment of the present invention may advantageously provide a lens drive device which is capable of restraining a variation quantity of inclination of the optical axis of the lens.

According to at least an embodiment of the present invention, there may be provided a lens drive device, which is formed in a substantially quadrangular shape when viewed in an optical axis direction of a lens, including a movable body which holds the lens and is movable in the optical axis direction, a fixed body which movably holds the movable body in the optical axis direction, and a drive mechanism for driving the movable body in the optical axis direction. The drive mechanism includes first drive magnets which are respectively disposed on four side faces of the lens drive device, a second drive magnet which is disposed on at least one of four corners of the lens drive device, and a drive coil which is wound around in a substantially octagonal shape when viewed in the optical axis direction and is disposed so as to face the first drive magnets and the second drive magnet. In the lens drive device, one of the following two is satisfied, that is, magnetic flux passing through the drive coil at one corner of four corners of the lens drive device is different from magnetic fluxes passing through the drive coil at the other three corners of the four corners of the lens drive device, and magnetic fluxes passing through the drive coil at two corners adjacent to each other of the four corners of the lens drive device are different from magnetic fluxes passing through the drive coil at the other two corners of the four corners of the lens drive device.

In the lens drive device in accordance with an embodiment of the present invention, the drive mechanism for driving the movable body in the optical axis direction is provided with a second drive magnet, which is disposed at least one of four corners of the lens drive device, in addition to the first drive magnets which are disposed on the respective four side faces of the lens drive device. Further, in accordance with an embodiment of the present invention, magnetic flux passing through the drive coil at one corner of the four corners of the lens drive device is different from magnetic fluxes passing through the drive coil at other three corners of the four corners of the lens drive device. Alternatively, magnetic fluxes passing through the drive coil at two corners adjacent to each other of the four corners of the lens drive device are different from magnetic fluxes passing through the drive coil at the other two corners of the four corners of the lens drive device. Therefore, a correcting driving force for the movable body is generated against a direction in which the movable body holding the lens is inclined with respect to the fixed body by an operation of magnetic field which is generated by the second drive magnet. Therefore, in accordance with an embodiment of the present invention, even in a case that variation occurs in the inclination of the optical axis of the lens when an electric current is supplied to the drive coil due to accuracy of respective components structuring the lens drive device or assembling accuracy of the lens drive device, the variation quantity of the inclination of the optical axis of the lens is restrained by disposing the second drive magnet at an appropriate position.

In accordance with an embodiment of the present invention, the second drive magnet is disposed at one corner, three corners or two corners adjacent to each other of the four corners of the lens drive device. According to this structure, in comparison with a case that the second drive magnet is disposed at each of the four corners of the lens drive device, the structure of the lens drive device is simplified. The second drive magnet is disposed at a position for restraining a variation quantity of the inclination of the optical axis of the lens with respect to the fixed body when an electric current is supplied to the drive coil. Specifically, the second drive magnet may be disposed on a side where the optical axis is inclined when an electric current is supplied to the drive coil in the lens drive device in which the second drive magnet is not attached.

In accordance with an embodiment of the present invention, the second drive magnet is disposed at each of the four corners of the lens drive device, and one of the following two is satisfied. In other words, magnetic flux passing through the drive coil which is generated from the second drive magnet disposed at one corner of the four corners of the lens drive device is different from magnetic fluxes passing through the drive coil which are generated from the remaining second drive magnets disposed at the other three corners of the four corners of the lens drive device, or magnetic fluxes passing through the drive coil which are generated from the second drive magnets disposed at two corners adjacent to each other of the four corners of the lens drive device are different from magnetic fluxes passing through the drive coil which are generated from the remaining second drive magnets disposed at the other two corners of the four corners of the lens drive device. In this case, it is preferable that the second drive magnet is disposed on a side where the optical axis is inclined when an electric current is supplied to the drive coil in the lens drive device in which the second drive magnet is not attached so that the magnetic flux passing through the drive coil becomes larger by the second drive magnet.

In accordance with an embodiment of the present invention, the second drive magnet is disposed at each of the four corners of the lens drive device, and one of the following two is satisfied. In other words, magnetic flux density generated from the second drive magnet which is disposed at one corner of the four corners of the lens drive device is different from magnetic flux densities generated from the remaining second drive magnets which are disposed at the other three corners of the four corners of the lens drive device, or magnetic flux densities generated from the two second drive magnets which are disposed at two corners of the four corners of the lens drive device are different from magnetic flux densities generated from the remaining second drive magnets which are disposed at the other two corners of the four corners of the lens drive device.

Alternatively, in accordance with an embodiment of the present invention, the second drive magnet is disposed at each of the four corners of the lens drive device, and one of the following two is satisfied. In other words, a distance between the second drive magnet which is disposed at one corner of the four corners of the lens drive device and the drive coil is different from distances between the remaining second drive magnets which are disposed at the other three corners of the four corners of the lens drive device, or distances between the second drive magnets which are disposed at two corners adjacent to each other of the four corners of the lens drive device and the drive coil are different from distances between the remaining second drive magnets which are disposed at the other two corners of the four corners of the lens drive device.

According to these structures described above, a variation quantity of the inclination of the optical axis of the lens is restrained while increasing a driving force in the optical axis direction for the movable body by utilizing the magnetic fields generated by the second drive magnets which are disposed at each of the four corners of the lens drive device.

In accordance with an embodiment of the present invention, the lens drive device is provided with the drive coil comprised of a first drive coil and a second drive coil which are attached to the movable body in a separated state from each other with a predetermined space and overlapped with each other in the optical axis direction. The first drive magnet is comprised of a first magnet part and a second magnet part which are disposed so as to overlap with each other in the optical axis direction and whose opposed faces to the drive coil are magnetized in different magnetic poles from each other, and the second drive magnet is comprised of a third magnet part and a fourth magnet part which are disposed so as to overlap with each other in the optical axis direction and whose opposed faces to the drive coil are magnetized in different magnetic poles from each other. Lengths in the optical axis direction of the first magnet part and the third magnet part are substantially the same as each other and the first magnet part and the third magnet part are disposed at substantially the same position as each other in the optical axis direction, and lengths in the optical axis direction of the second magnet part and the fourth magnet part are substantially the same as each other and the second magnet part and the fourth magnet part are disposed at substantially the same position as each other in the optical axis direction. An opposed face to the drive coil of the first magnet part and an opposed face to the drive coil of the third magnet part are magnetized in the same magnetic pole as each other, and an opposed face to the drive coil of the second magnet part and an opposed face to the drive coil of the fourth magnet part are magnetized in the same magnetic pole as each other. In this case, while a driving force in the optical axis direction for the movable body is increased, a correcting driving force for restraining a variation quantity of the inclination of the optical axis of the lens is increased by utilizing magnetic fields which are generated by the third magnet part and the fourth magnet part.

In accordance with an embodiment of the present invention, the lens drive device is provided with the drive coil comprised of a first drive coil and a second drive coil which are attached to the movable body in a separated state from each other with a predetermined space and overlapped with each other in the optical axis direction, and the first drive magnet is comprised of a first magnet part and a second magnet part which are disposed so as to overlap with each other in the optical axis direction and whose opposed faces to the drive coil are magnetized in different magnetic poles from each other, and one of the following two is satisfied. In other words, a length of the second drive magnet is substantially the same as a length of the first magnet part in the optical axis direction and the second drive magnet is disposed at substantially the same position as the first magnet part in the optical axis direction, and an opposed face to the drive coil of the second drive magnet is magnetized in the same magnetic pole as an opposed face to the drive coil of the first magnet part, or a length of the second drive magnet is substantially the same as a length of the second magnet part in the optical axis direction and the second drive magnet is disposed at substantially the same position as the second magnet part in the optical axis direction, and an opposed face to the drive coil of the second drive magnet is magnetized in the same magnetic pole as an opposed face to the drive coil of the second magnet part. In this case, a variation quantity of the inclination of the optical axis of the lens is restrained while increasing a driving force in the optical axis direction for the movable body and reducing the size of the second drive magnet.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

An embodiment of the present invention will be described below with reference to the accompanying drawings.

Figure 1:
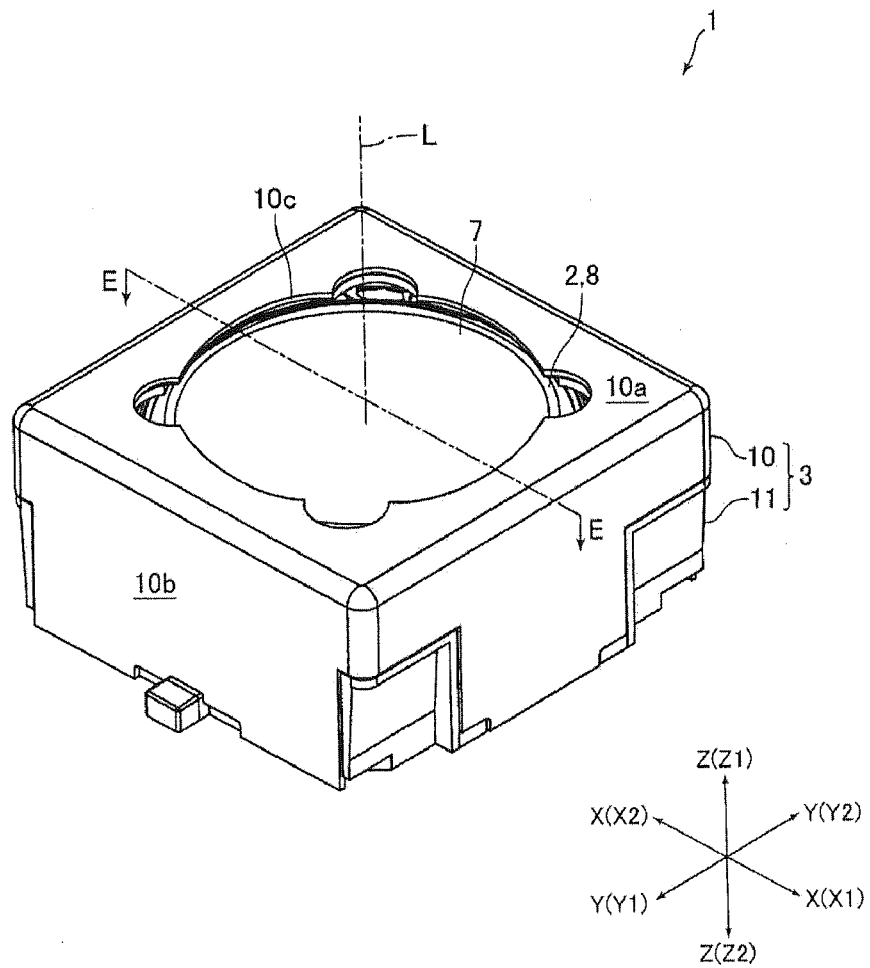
FIG. 1 is a perspective view showing a lens drive device in accordance with an embodiment of the present invention.
Figure 2:
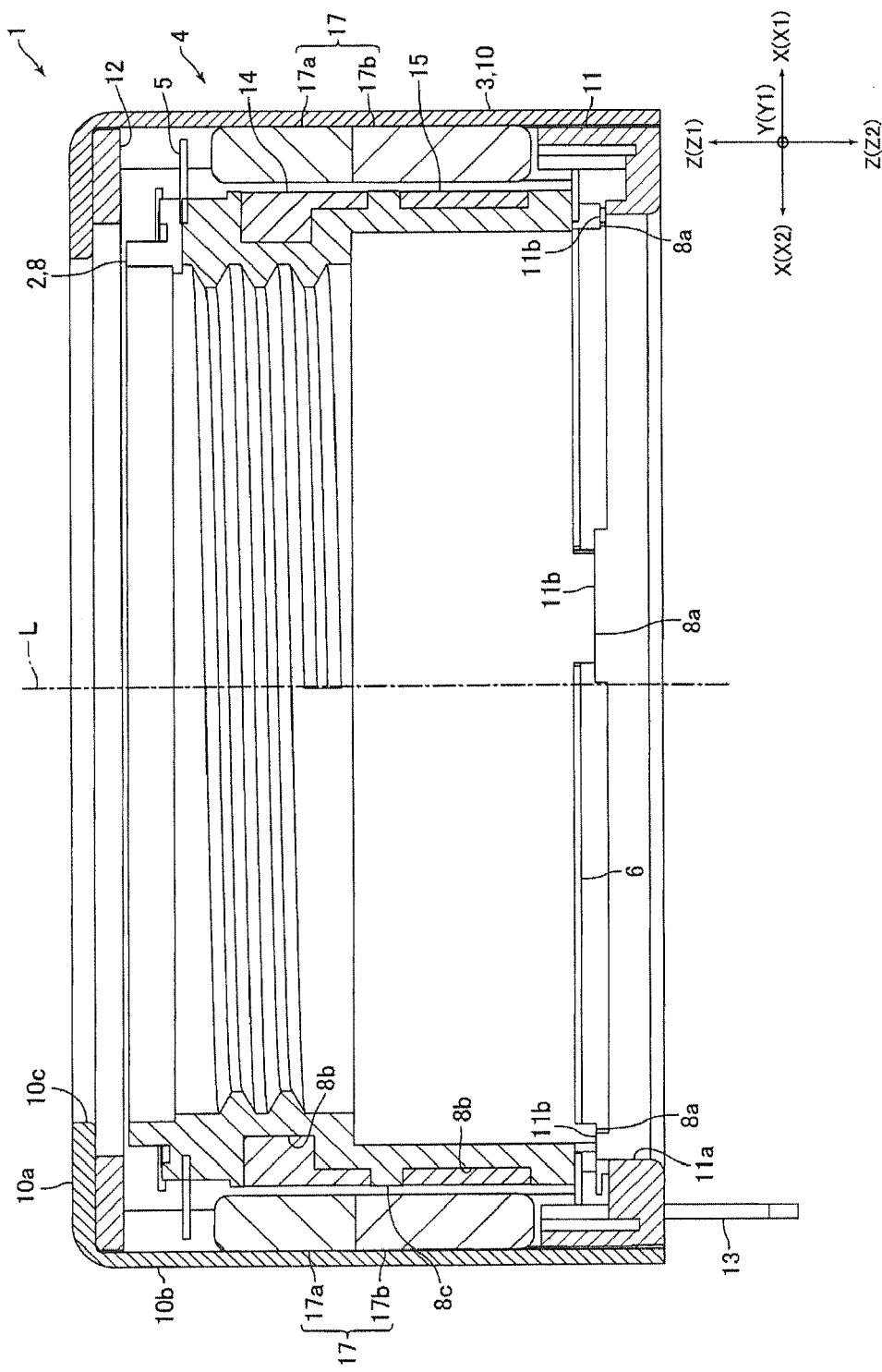
FIG. 2 is a cross-sectional view showing the lens drive device which is cut by the "E-E" line in FIG. 1.
Figure 3:
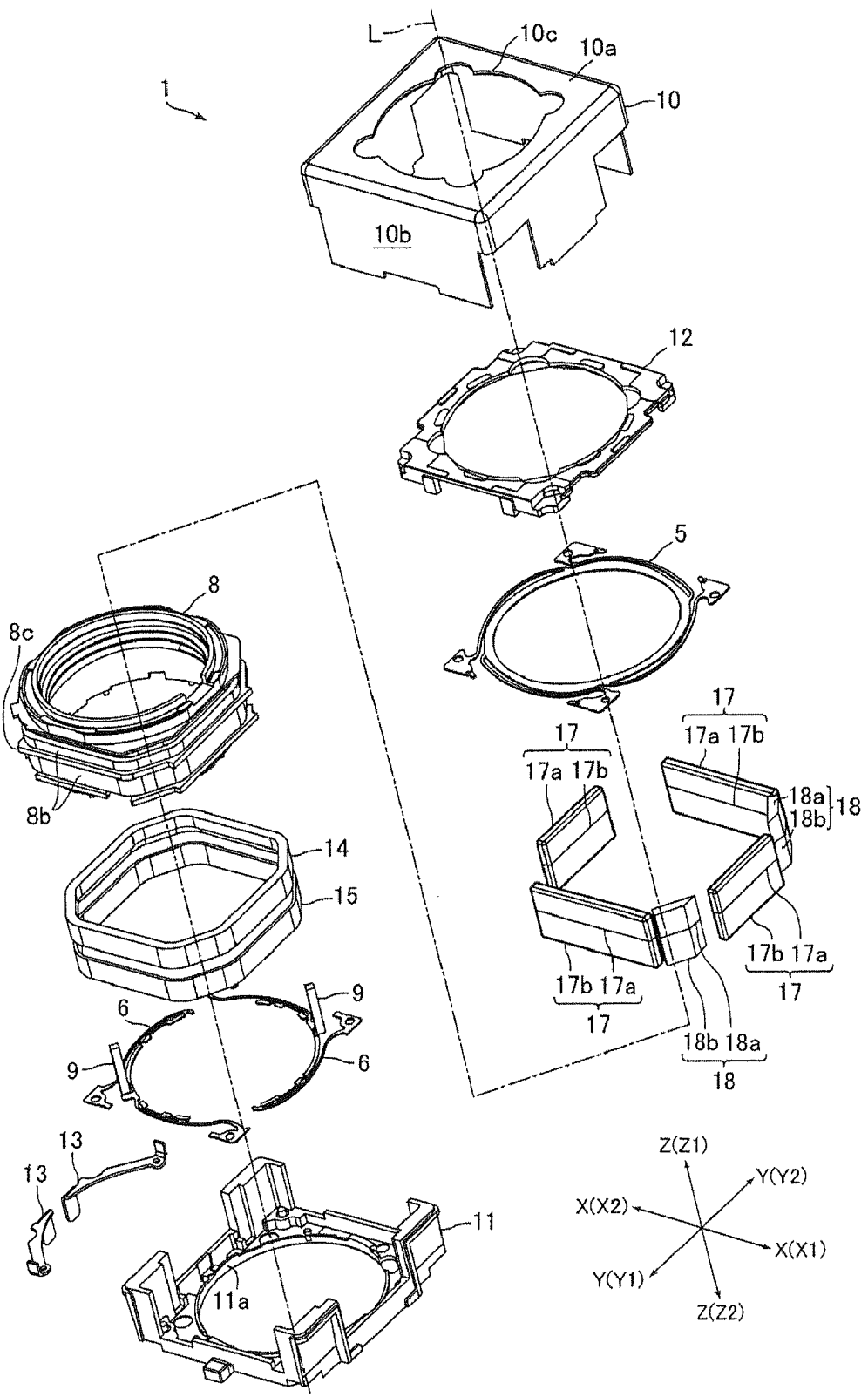
FIG. 3 is an exploded perspective view showing the lens drive device in FIG. 1.

FIG. 1 is a perspective view showing a lens drive device 1 in accordance with an embodiment of the present invention. FIG. 2 is a cross-sectional view showing the lens drive device 1 which is cut by the "E-E" line in FIG. 1. FIG. 3 is an exploded perspective view showing the lens drive device 1 in FIG. 1. In the following description, as shown in FIG. 1 and the like, three directions perpendicular to each other are set to be "X" direction, "Y" direction and "Z" direction. Further, in FIG. 1 and the like, an "X1" direction side is referred to as "right" side, an "X2" direction side is as "left" side, a "Y1" direction side is as "front" side, a "Y2" direction side is as "rear" side, a "Z1" direction side is an "upper" side, and a "Z2" direction side is as a "lower" side.

A lens drive device 1 in this embodiment is mounted on a relatively small camera which is used in a cellular phone, a drive recorder, a monitor camera system or the like. The lens drive device 1 is, as shown in FIG. 1, formed in a roughly square prismatic shape as a whole. Specifically, the lens drive device 1 is formed in a substantially square shape when viewed in a direction of an optical axis "L" of a lens for photography (optical axis direction). Further, four side faces of the lens drive device 1 are substantially parallel to the right and left direction and the front and rear direction.

In this embodiment, the "Z" direction (upper and lower direction) is substantially coincided with the optical axis direction. Further, in the camera on which the lens drive device 1 in this embodiment is mounted, an imaging element not shown is disposed on its lower side and an object to be photographed on an upper side is photographed. In other words, in this embodiment, the upper side ("Z1" direction side) is an object to be photographed side (object side) and the lower side ("Z2" direction side) is an opposite-to-object side (imaging element side, image side).

As shown in FIGS. 1 through 3, the lens drive device 1 is provided with a movable body 2, which holds a lens for photography and is movable in the optical axis direction, a fixed body 3 which movably holds the movable body 2 in the optical axis direction, and a drive mechanism 4 for driving the movable body 2 in the optical axis direction. Further, the lens drive device 1 is provided with flat springs 5 and 6 which connect the movable body 2 with the fixed body 3. In other words, the movable body 2 is movably held by the fixed body 3 through the flat springs 5 and 6. In this embodiment, one piece of the flat spring 5 is disposed on an upper end side of the movable body 2 and two pieces of the flat spring 6 are disposed on a lower end side of the movable body 2.

The movable body 2 is provided with a sleeve 8, which holds a lens holder 7 to which a plurality of lenses are fixed, and two binding pins 9 to which end parts of drive coils 14 and 15 structuring the drive mechanism 4 are bound. The fixed body 3 is provided with a cover member 10 which structures side faces of the lens drive device 1, a base member 11 which structures an end face on the opposite-to-object side of the lens drive device 1, a spacer 12 to which a part of the flat spring 5 is fixed, and two power supply terminals 13 for supplying an electric current to the drive coils 14 and 15 described below. In FIGS. 2 and 3, the lens holder 7 is not shown.

The lens holder 7 is formed in a substantially cylindrical tube shape. A plurality of lenses is fixed to an inner peripheral side of the lens holder 7.

The sleeve 8 is, for example, formed of resin material and formed in a roughly tube-like shape. Specifically, the sleeve 8 is formed in a roughly tube-like shape in which a shape of its inner peripheral face is a substantially circular shape when viewed in the upper and lower direction and a shape of its outer peripheral face when viewed in the upper and lower direction is formed in a substantially octagonal shape. The sleeve 8 holds the lens holder 7 on its inner peripheral side. In other words, an outer peripheral face of the lens holder 7 is fixed to an inner peripheral face of the sleeve 8. Further, a magnetic member formed in a ring shape is fixed to an upper end side of the sleeve 8.

A lower end of the sleeve 8 is formed with an abutting face 8a (see FIG. 2) which is abutted with a reference face 11b described below that is formed on the base member 11 so as to be substantially perpendicular to the optical axis direction. Specifically, four abutting faces 8a are formed at substantially center positions in the front and rear direction and the right and left direction of the lower end of the sleeve 8 at a pitch of substantially 90°.

Further, an outer peripheral side of the sleeve 8 is formed with winding recessed parts 8b (see FIG. 2) around which the drive coils 14 and 15 are wound. The winding recessed part 8b is formed so as to be recessed from the outer peripheral face of the sleeve 8. Further, the winding recessed part 8b is formed on two portions in a separated state with a predetermined space therebetween in the upper and lower direction and a flange part 8c is formed between the two winding recessed parts 8b so as to extend from a bottom face of the winding recessed part 8b to an outer side of the sleeve 8 in the radial direction. In other words, the sleeve 8 is formed with the flange part 8c which is disposed between the drive coils 14 and 15.

The binding pin 9 is formed of metal material having electroconductivity. The binding pin 9 is fixed to a fixing hole formed in the sleeve 8. Further, the binding pin 9 is fixed to the sleeve 8 so that a lower end side of the binding pin 9 is protruded to a lower side with respect to the lower end of the sleeve 8. The end parts of the drive coils 14 and 15 are wound around the lower ends of the binding pins 9 protruded from the lower end of the sleeve 8.

The cover member 10 is formed of magnetic material. Further, the cover member 10 is formed in a substantially rectangular tube shape with a bottom and the cover member 10 is provided with a bottom part 10a and a tube part 10b. A through hole 10c is formed at a center of the bottom part 10a which is disposed on an upper side.

The base member 11 is formed of resin material having insulation property. Further, the base member 11 is formed in a block-like shape which is a substantially square shape when viewed in the optical axis direction. The base member 11 is attached to the lower end of the cover member 10. A through hole 11a is formed at a center of the base member 11. Further, an upper face of the base member 11 is formed with reference faces 11b, which are substantially perpendicular to the optical axis direction, for determining a reference position of the movable body 2 in the optical axis direction (see FIG. 2). Specifically, four reference faces 11b are formed at substantially center positions in the front and rear direction and the right and left direction of the upper faces of the base member 11 at a pitch of substantially 90°.

The spacer 12 is, for example, formed of resin material and formed in a substantially flat and square block shape. The spacer 12 is fixed to an under face of the bottom part 10a of the cover member 10.

The flat spring 5 is provided with a ring-shaped movable body fixing part which is fixed to the upper end side of the sleeve 8, four fixed body fixing parts which are fixed to the spacer 12, and four arm parts which connect the movable body fixing part with the fixed body fixing parts. The flat spring 5 is fixed to the sleeve 8 and the spacer 12 so that its thickness direction is substantially coincided with the upper and lower direction. Further, the flat spring 5 is fixed to the sleeve 8 and the spacer 12 in a resiliently bent state so that, when an electric current is not supplied to the drive coils 14 and 15, the abutting face 8a of the sleeve 8 and the reference face 11b of the base member 11 are abutted with each other to make the movable body 2 locate at a predetermined reference position.

The flat spring 6 is provided with a movable body fixing part which is fixed to the lower end side of the sleeve 8, two fixed body fixing parts which are fixed to the base member 11, and two arm parts which connect the movable body fixing part with the fixed body fixing part. The flat spring 6 is fixed to the sleeve 8 and the base member 11 so that its thickness direction is substantially coincided with the upper and lower direction. Further, the flat spring 6 is fixed to the sleeve 8 and the base member 11 so that, when the abutting face 8a of the sleeve 8 and the reference face 11b of the base member 11 are abutted with each other, an urging force by the flat springs 6 is not applied to the movable body 2. Respective two flat springs 6 are fixed with two binding pins 9 by soldering or the like.

The power supply terminal 13 is structured by means of that a flat plate-shaped metal member is bent. The power supply terminal 13 is fixed to the base member 11. Further, a part of the flat spring 6 is fixed to the power supply terminal 13 by soldering or the like.

The drive mechanism 4 is provided with two drive coils 14 and 15 which are wound around the outer peripheral face of the sleeve 8, drive magnets 17 as a first drive magnet which are disposed on respective four side faces of the lens drive device 1, and a drive magnet 18 as a second drive magnet which is disposed at one corner of four corners of the lens drive device 1 or at two corners of the four corners of the lens drive device 1 which are adjacent to each other in a circumferential direction of the lens drive device 1. A detailed structure of the drive mechanism 4 will be described below.

Figure 4:
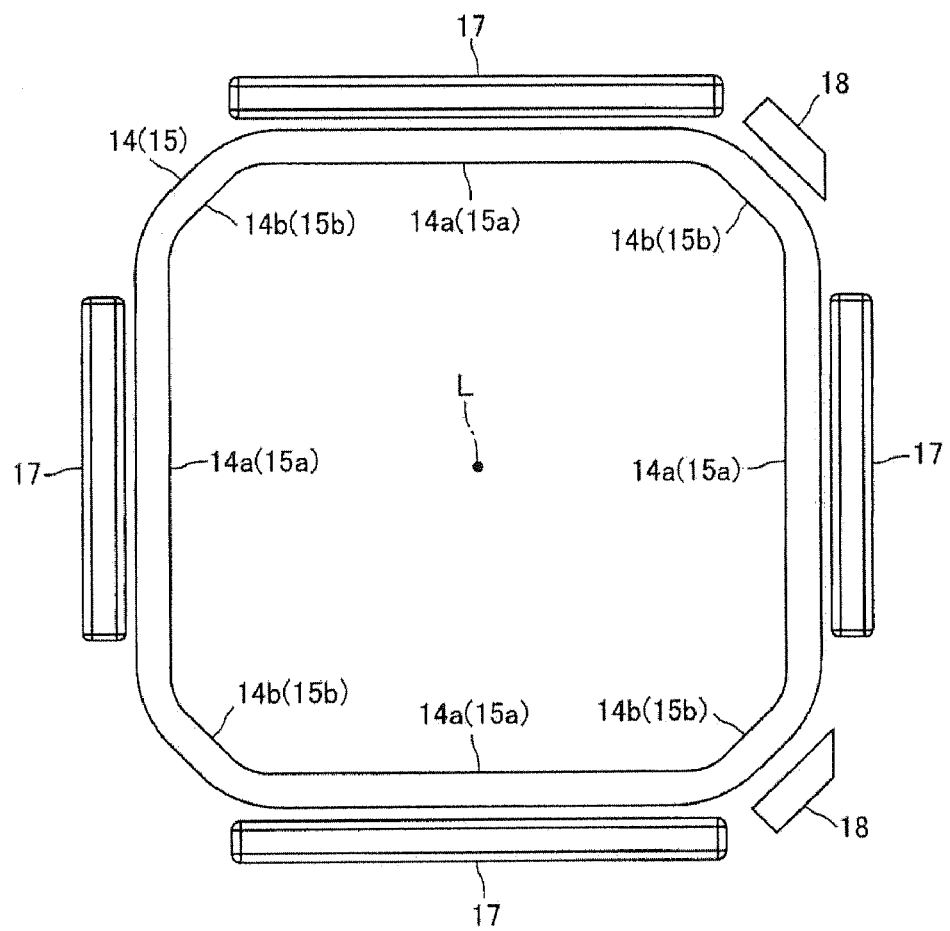
FIG. 4 is an explanatory plan view showing an arrangement relationship of a drive coil and drive magnets shown in FIG. 3.
Figure 4:
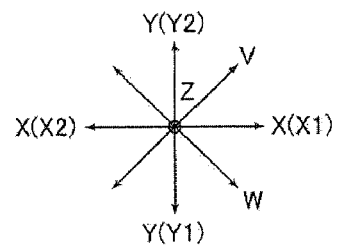

FIG. 4 is an explanatory plan view showing an arrangement relationship of the drive coils 14 and 15 and the drive magnets 17 and 18 shown in FIG. 3.

Two drive coils 14 and 15 are wound around the winding recessed parts 8b of the sleeve 8 in a separated state with a predetermined space therebetween in the upper and lower direction. In other words, the drive coils 14 and 15 are wound around the sleeve 8 so as to be overlapped with each other in the upper and lower direction in the separated state with the predetermined space therebetween. In this embodiment, the drive coil 14 is disposed on an upper side and the drive coil 15 is disposed on a lower side. The drive coil 14 in this embodiment is a first drive coil and the drive coil 15 is a second drive coil.

The drive coils 14 and 15 are wound around in a substantially octagonal shape when viewed in the upper and lower direction. Specifically, the drive coils 14 and 15 are structured of four long side parts 14a and 15a, which are disposed to be substantially parallel to the front and rear direction or the right and left direction, and four short side parts 14b and 15b which are formed shorter than the long side parts 14a and 15a and disposed in a state inclined at about 45° with respect to the front and rear direction and the right and left direction. Further, the drive coils 14 and 15 are, for example, formed of one conducting wire which is wound successively. End parts of winding start sides of the drive coils 14 and 15 are wound around one of two binding pins 9 and end parts of winding end sides of the drive coils 14 and 15 are wound around the other of two binding pins 9.

Further, the drive coils 14 and 15 are wound around so that a direction of an electric current supplied to the drive coil 14 is different from a direction of an electric current supplied to the drive coil 15. In other words, for example, the drive coils 14 and 15 are wound around so that, when a direction of an electric current supplied to the drive coil 14 is a clockwise direction when viewed from an upper side, a direction of an electric current supplied to the drive coil 15 is a counterclockwise direction.

The drive magnet 17 is formed in a substantially rectangular plate shape. Specifically, the drive magnet 17 is formed in a substantially rectangular plate shape whose shape when viewed in the optical axis direction is a flat rectangular shape. The drive magnet 17 is fixed to inner side faces of the tube part 10b of the cover member 10 so as to face outer side faces of the long side parts 14a and 15a of the drive coils 14 and 15. In this embodiment, as shown in FIG. 4, a width in the right and left direction of the drive magnet 17 which is disposed in substantially parallel to the right and left direction is set to be wider than a width in the front and rear direction of the drive magnet 17 which is disposed in substantially parallel to the front and rear direction.

The drive magnet 18 is formed in a substantially rectangular plate shape. Specifically, the drive magnet 18 is formed in a substantially rectangular plate shape whose shape when viewed in the optical axis direction is a flat right-angled trapezoid shape. The drive magnet 18 is fixed to the inner side face of the tube part 10b of the cover member 10 or the like so as to face the outer side faces of the short side parts 14b and 15b of the drive coils 14 and 15.

In this embodiment, a length of the drive magnet 17 and a length of the drive magnet 18 in the upper and lower direction are substantially equal to each other and the drive magnets 17 and 18 are fixed to the inner side face of the tube part 10b or the like so that a lower end of the drive magnet 18 is substantially coincided with a lower end of the drive magnet 17. In this embodiment, the cover member 10 functions as a yoke for forming a magnetic circuit.

The drive magnet 17 is structured of two drive magnet pieces 17a and 17b which are formed in a substantially rectangular plate shape and disposed so as to be overlapped with each other in the upper and lower direction. In this embodiment, the drive magnet piece 17a is disposed on an upper side and the drive magnet piece 17b is disposed on a lower side. The drive magnet pieces 17a and 17b are fixed to each other in a state that a lower end face of the drive magnet piece 17a and an upper end face of the drive magnet piece 17b are abutted with each other. The drive magnet piece 17a in this embodiment is a first magnet part and the drive magnet piece 17b is a second magnet part.

The drive magnet pieces 17a and 17b are magnetized so that magnetic poles of their opposed faces to the drive coils 14 and 15 are different from each other. In other words, the opposed face to the drive coils 14 and 15 of the drive magnet 17 is magnetized in two poles. For example, the opposed face to the drive coils 14 and 15 of the drive magnet piece 17a is magnetized in an "N"-pole and the opposed face to the drive coils 14 and 15 of the drive magnet piece 17b is magnetized in an "S"-pole.

The drive magnet 18 is structured of two drive magnet pieces 18a and 18b which are formed in a substantially rectangular plate shape and disposed so as to be overlapped with each other in the upper and lower direction. In this embodiment, the drive magnet piece 18a is disposed on an upper side and the drive magnet piece 18b is disposed on a lower side. The drive magnet pieces 18a and 18b are fixed to each other in a state that a lower end face of the drive magnet piece 18a and an upper end face of the drive magnet piece 18b are abutted with each other. The drive magnet piece 18a in this embodiment is a third magnet part and the drive magnet piece 18b is a fourth magnet part.

A length of the drive magnet piece 18a in the upper and lower direction is substantially equal to a length of the drive magnet piece 17a in the upper and lower direction and a length of the drive magnet piece 18b in the upper and lower direction is substantially equal to a length of the drive magnet piece 17b in the upper and lower direction. Further, the drive magnet pieces 18a and 18b are magnetized so that magnetic poles of their opposed faces to the drive coils 14 and 15 are different from each other. In other words, the opposed face to the drive coils 14 and 15 of the drive magnet 18 is magnetized in two poles. Further, the opposed face to the drive coils 14 and 15 of the drive magnet piece 18a is magnetized in the same magnetic pole as the magnetic pole of the opposed face to the drive coils 14 and 15 of the drive magnet piece 17a, and the opposed face to the drive coils 14 and 15 of the drive magnet piece 18b is magnetized in the same magnetic pole as the magnetic pole of the opposed face to the drive coils 14 and 15 of the drive magnet piece 17b.

In this embodiment, as described above, the drive magnet 18 is disposed at one corner of four corners of the lens drive device 1 or two corners adjacent to each other of the four corners of the lens drive device 1. In other words, in this embodiment, a magnetic flux passing through the drive coils 14 and 15 at the one corner of the four corners of the lens drive device 1 (specifically, magnetic flux passing through the short side parts 14b and 15b) is different from magnetic fluxes passing through the drive coils 14 and 15 at the other three corners of the four corners of lens drive device 1. Alternatively, magnetic fluxes passing through the drive coils 14 and 15 at two corners adjacent to each other of the four corners of the lens drive device 1 are different from magnetic fluxes passing through the drive coils 14 and 15 at the other two corners of the four corners of the lens drive device 1. Specifically, the magnetic flux passing through the drive coils 14 and 15 at a position where the drive magnet 18 is disposed at one of the four corners of the lens drive device 1 is larger than the magnetic fluxes passing through the drive coils 14 and 15 at the other three corners of the four corners of the lens drive device 1. Alternatively, magnetic fluxes passing through the drive coils 14 and 15 at positions where the drive magnets 18 are disposed at two corners adjacent to each other of the four corners of the lens drive device 1 are different from magnetic fluxes passing through the drive coils 14 and 15 at the other two corners of the four corners of the lens drive device 1.

Figure 5A:
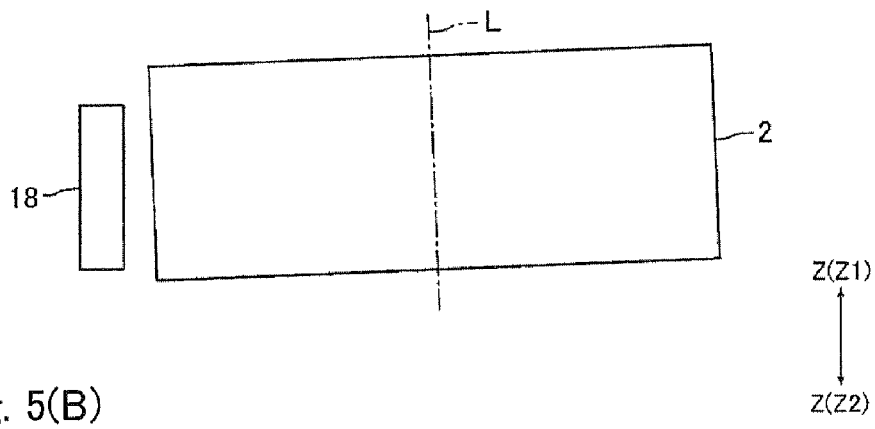
FIGS. 5(A), 5(B) and 5(C) are schematic views for explaining a determination method of a mounting position of a second drive magnet shown in FIG. 3.
Figure 5B:
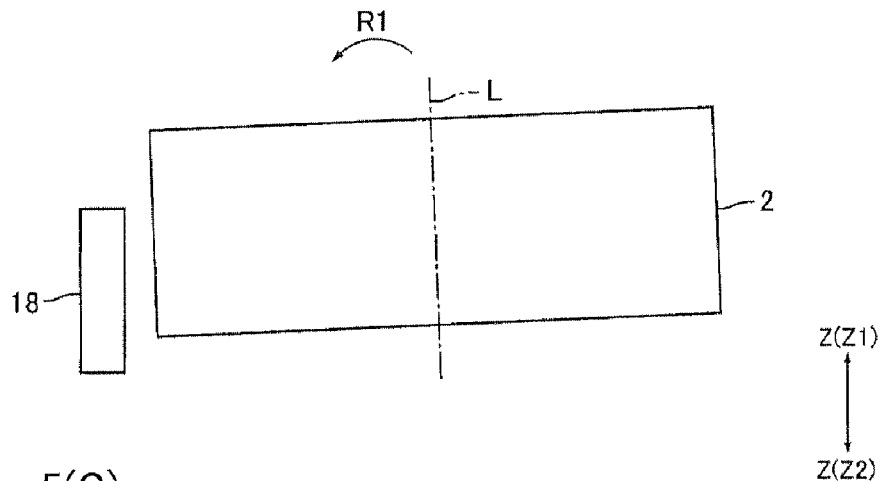
Figure 5C:
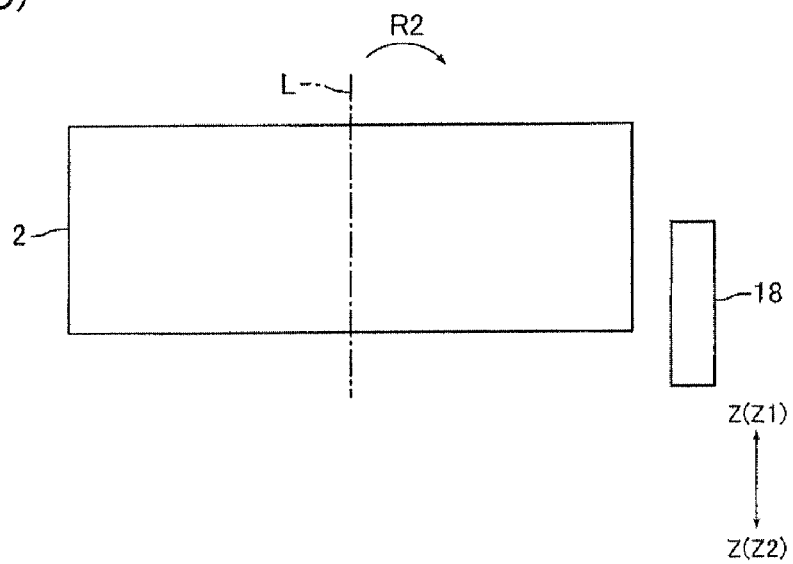

FIGS. 5(A), 5(B) and 5(C) are schematic views for explaining a determination method of a mounting position of the drive magnet 18 shown in FIG. 3. In the following descriptions, as shown in FIG. 4, a direction which is inclined at 45° with respect to the "X" direction and the "Y" direction and which is directed in the left front side and the right rear side is set in a "V" direction, and a direction which is inclined at 45° with respect to the "X" direction and the "Y" direction and which is directed in the right front side and the left rear side is set in a "W" direction.

In the lens drive device 1 structured as described above, when an electric current is supplied to the drive coils 14 and 15, inclination of the optical axis "L" may be varied by about several minutes with respect to the fixed body 3 caused by accuracy of respective components structuring the lens drive device 1 and assembling accuracy of the lens drive device 1. Further, as described above, the drive magnet 18 is disposed at one corner or two corners adjacent to each other of the four corners of the lens drive device 1. In this embodiment, the drive magnet 18 is mounted at a position where a variation quantity of inclination of the optical axis "L" with respect to the fixed body 3 is capable of being restrained when an electric current is supplied to the drive coils 14 and 15. For example, a mounting position of the drive magnet 18 is determined as described below.

In other words, first, in a lens drive device 1 in which the drive magnet 18 is not attached, an electric current is supplied to the drive coils 14 and 15 to inspect variation characteristic of inclination of the optical axis "L" with respect to the fixed body 3. On the basis of the inspection result of the variation characteristic of inclination of the optical axis "L" (inclination variation characteristic), a position which is capable of restraining a variation quantity of the inclination of the optical axis "L" is determined as a mounting position of the drive magnet 18.

For example, as a result of having inspected an inclination variation characteristic of the optical axis "L", when variation of inclination of the optical axis "L" is occurred with the "Y" direction as an axial direction, two on the right side of four corners of the lens drive device 1 (see FIG. 4) or two on the left side of the four corners of the lens drive device 1 are determined as the mounting position of the drive magnet 18. Further, as a result of having inspected an inclination variation characteristic of the optical axis "L", when variation of inclination of the optical axis "L" is occurred with the "X" direction as an axial direction, two on the front side of four corners of the lens drive device 1 or two on the rear side of the four corners of the lens drive device 1 are determined as the mounting position of the drive magnet 18.

Further, as a result of having inspected an inclination variation characteristic of the optical axis "L", when variation of inclination of the optical axis "L" is occurred with the "V" direction as an axial direction, one on the right front side of four corners of the lens drive device 1 or one on the left rear side of four corners of the lens drive device 1 is determined as the mounting position of the drive magnet 18. Further, as a result of having inspected an inclination variation characteristic of the optical axis "L", when variation of inclination of the optical axis "L" is occurred with the "W" direction as an axial direction, one on the left front side of four corners of the lens drive device 1 or one on the right rear side of four corners of the lens drive device 1 is determined as the mounting position of the drive magnet 18.

The variation of inclination of the optical axis "L" includes variation of inclination of the optical axis "L" which is occurred until the movable body 2 begins to move after supplying of an electric current to the drive coils 14 and 15 is started (hereinafter, this variation of inclination of the optical axis "L" is referred to as "initial tilt variation"), and variation of inclination of the optical axis "L" which is occurred after the movable body 2 begins to move (hereinafter, this variation of inclination of the optical axis "L" is referred to as "moving tilt variation"). In other words, the initial tilt variation is variation of inclination of the optical axis "L" which is occurred from a state that the abutting face 8a of the sleeve 8 and the reference face 11b of the base member 11 are abutted with each other by a magnetic attraction force generated between a magnetic member fixed to an upper end side of the sleeve 8 and the drive magnets 17 and 18 and by an urging force of the flat spring 5 until the movable body 2 begins to move against the attraction force and the urging force. Further, the moving tilt variation is variation of inclination of the optical axis "L" which is occurred until the movable body 2 having been moved is abutted with a stopper formed on the object to be photographed side (in other words, until the movable body 2 is moved to a moving limit on the object to be photographed side).

In order to mainly restrain a quantity of the initial tilt variation, as shown in FIG. 5(A), the drive magnet 18 is disposed on a side where the optical axis "L" is inclined before the movable body 2 begins to move after supplying of an electric current to the drive coils 14 and 15 is started. Therefore, inclination of the optical axis "L" is restrained by increasing a driving force in the optical axis direction on the inclined side when an electric current to the drive coils 14 and 15 is supplied. Further, in order to mainly restrain a quantity of the moving tilt variation and, in this case, when a direction where the optical axis "L" is inclined after the movable body 2 begins to move is the same as the direction of inclination of the optical axis "L" before the movable body 2 begins to move ("R1" direction in FIG. 5(B)), as shown in FIG. 5(B), the drive magnet 18 is disposed on a side that the optical axis "L" has been inclined when the movable body 2 begins to move. Therefore, also in this case, inclination of the optical axis "L" is restrained by increasing a driving force in the optical axis direction on the inclined side when an electric current to the drive coils 14 and 15 is supplied. Further, in a case that a quantity of the moving tilt variation is mainly to be restrained and that a direction where the optical axis "L" is inclined after the movable body 2 begins to move is an opposite direction to the direction of inclination of the optical axis "L" before the movable body 2 begins to move ("R2" direction in FIG. 5(C)), as shown in FIG. 5(C), the drive magnet 18 is disposed on an opposite side to the direction of inclination of the optical axis "L" before the movable body 2 begins to move.

As described above, in this embodiment, the drive mechanism 4 is provided with the drive magnets 17, which are disposed on the respective four side faces of the lens drive device 1, and in addition, the drive magnet 18 which is disposed at one corner or two corners adjacent to each other of the four corners of the lens drive device 1. Therefore, in this embodiment, the drive magnet 18 is disposed at an appropriate position on the basis of inspection results of an inclination variation characteristic of the optical axis "L" and thus a variation quantity of inclination of the optical axis "L" is restrained.

In this embodiment, the drive magnet 18 is disposed at one corner or two corners adjacent to each other of the four corners of the lens drive device 1. Therefore, in comparison with a case that the drive magnet 18 is disposed at three corners of the four corners of the lens drive device 1 or that the drive magnet 18 is disposed at respective four corners of the lens drive device 1 for restraining a variation quantity of inclination of the optical axis "L", the structure of the lens drive device 1 is simplified.

In this embodiment, a length of the drive magnet piece 18*a* in the upper and lower direction is substantially equal to a length of the drive magnet piece 17*a* in the upper and lower direction and a length of the drive magnet piece 18*b* in the upper and lower direction is substantially equal to a length of the drive magnet piece 17*b* in the upper and lower direction. Further, the drive magnets 17 and 18 are disposed so that the lower end of the drive magnet 17 is substantially coincided with the lower end of the drive magnet 18. In addition, the opposed face to the drive coils 14 and 15 of the drive magnet piece 18*a* is magnetized in the same magnetic pole as the magnetic pole of the opposed face to the drive coils 14 and 15 of the drive magnet piece 17*a*, and the opposed face to the drive coils 14 and 15 of the drive magnet piece 18*b* is magnetized in the same magnetic pole as the magnetic pole of the opposed face to the drive coils 14 and 15 of the drive magnet piece 17*b*. Therefore, in this embodiment, a driving force for restraining a variation quantity of inclination of the optical axis "L" is increased while increasing a driving force in the optical axis direction for the movable body 2 by utilizing the magnetic fields which are generated by the drive magnet piece 18*a* and the drive magnet piece 18*b*.

In the embodiment described above, the drive magnet 18 is disposed at one or two corners adjacent to each other of the four corners of the lens drive device 1. However, the present invention is not limited to this embodiment. For example, the drive magnet 18 may be disposed at three corners of the four corners of the lens drive device 1.

Figure 6:
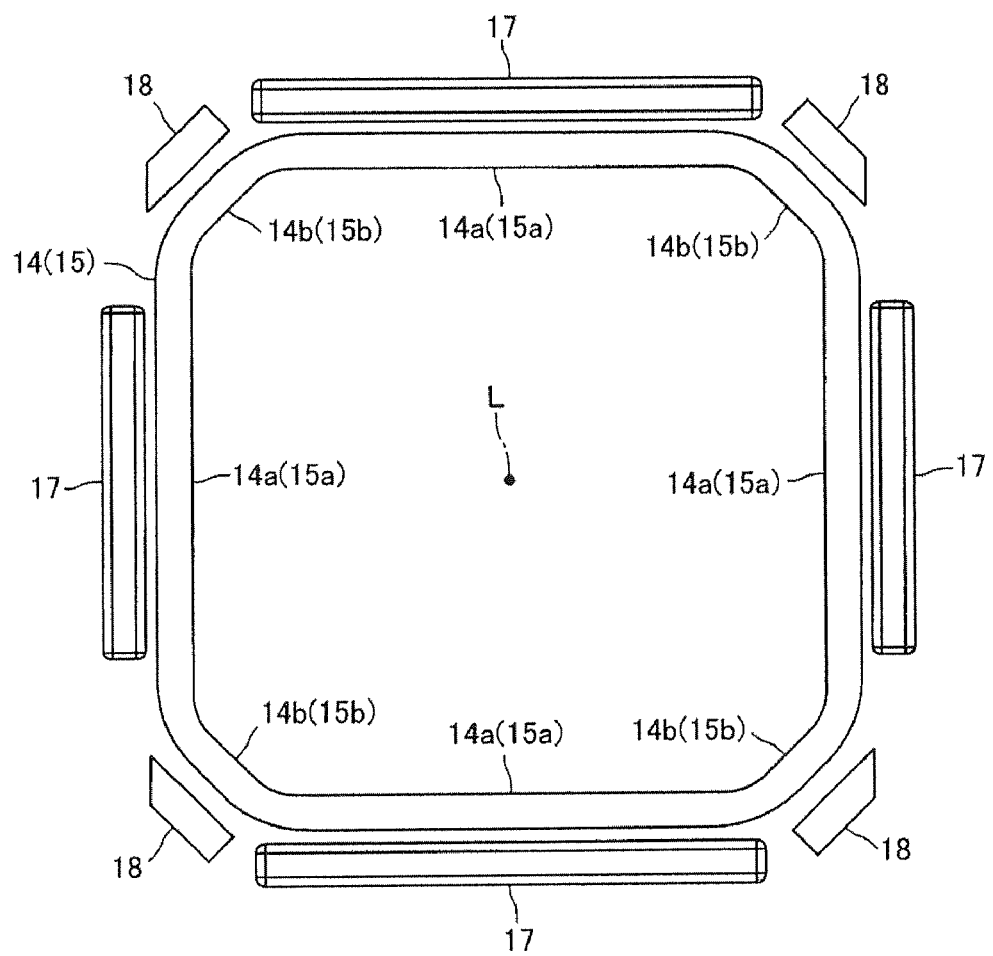
FIG. 6 is an explanatory plan view showing an arrangement relationship of a drive coil and drive magnets in accordance with another embodiment of the present invention.
Figure 6:
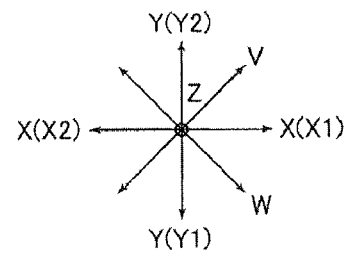

In the embodiment described above, the drive magnet 18 is disposed at one or two corners adjacent to each other of the four corners of the lens drive device 1. However, the present invention is not limited to this embodiment. For example, the drive magnet 18 may be disposed, as shown in FIG. 6, at respective four corners of the lens drive device 1. Also in this case, magnetic flux passing through the drive coils 14 and 15 at one corner of the four corners of the lens drive device 1 is different from magnetic fluxes passing through the drive coils 14 and 15 at the other three corners of four corners of the lens drive device 1. Alternatively, magnetic fluxes passing through the drive coils 14 and 15 at two corners adjacent to each other of the four corners of the lens drive device 1 are different from magnetic fluxes passing through the drive coils 14 and 15 at the other two corners of the four corners of the lens drive device 1.

For example, in a case that distances between the respective four drive magnets 18 and the drive coils 14 and 15 are substantially equal to each other, magnetic flux density generated by the drive magnet 18 which is disposed at one corner of the four corners of the lens drive device 1 is different from magnetic flux densities generated by the drive magnets 18 which are disposed at the other three corners of the four corners of the lens drive device 1. Alternatively, magnetic flux densities generated by the drive magnets 18 which are disposed at two corners adjacent to each other of the four corners of the lens drive device 1 are different from magnetic flux densities generated by the drive magnets 18 which are disposed at the other two corners of the four corners of the lens drive device 1.

In other words, the magnetic flux density generated by the drive magnet 18 which is disposed at one corner of the four corners of the lens drive device 1 is set to be larger than the magnetic flux density generated by the drive magnet 18 which is disposed at each of the other three corners of the four corners of the lens drive device 1 or, alternatively, set to be smaller than the magnetic flux density generated by the drive magnet 18 which is disposed at each of the other three corners. Alternatively, the magnetic flux densities generated by the drive magnets 18 which are disposed at two corners adjacent to each other of the four corners of the lens drive device 1 are set to be larger than the magnetic flux densities generated by the drive magnets 18 which are disposed at the other two corners of the four corners of the lens drive device 1. In other words, one of the four drive magnets 18 is magnetized strongly in comparison with the other three drive magnets 18 or one is magnetized weakly in comparison with the other three drive magnets 18. Alternatively, two drive magnets 18 adjacent to each other of the four drive magnets 18 are magnetized strongly in comparison with the other two drive magnets 18 or two are magnetized weakly in comparison with the other two drive magnets 18. In these cases, similarly to the embodiment described above, in the lens drive device 1 in which the drive magnets 18 are not attached, an electric current is supplied to the drive coils 14 and 15 to inspect variation characteristic of inclination of the optical axis "L" with respect to the fixed body 3. On the basis of the inspection result of the inclination variation characteristic of the optical axis "L", a position or positions where the drive magnet 18 whose magnetic flux density is larger is disposed with respect to the four corners of the lens drive device 1 is determined.

For example, in order to mainly restrain a quantity of the initial tilt variation, the drive magnet 18 whose magnetic flux density is larger is disposed on a side where the optical axis "L" is inclined before the movable body 2 begins to move after supplying of an electric current to the drive coils 14 and 15 is started. Therefore, inclination of the optical axis "L" is restrained by increasing a driving force in the optical axis direction on the inclined side when an electric current to the drive coils 14 and 15 is supplied. Further, in order to mainly restrain a quantity of the moving tilt variation and, in this case, when a direction where the optical axis "L" is inclined after the movable body 2 begins to move is the same as the direction of inclination of the optical axis "L" before the movable body 2 begins to move, the drive magnet 18 whose magnetic flux density is larger is disposed on a side that the optical axis "L" has been inclined when the movable body 2 begins to move. Therefore, also in this case, inclination of the optical axis "L" is restrained by increasing a driving force in the optical axis direction on the inclined side when an electric current to the drive coils 14 and 15 is supplied. Further, in a case that a quantity of the moving tilt variation is mainly to be restrained and that a direction where the optical axis "L" is inclined after the movable body 2 begins to move is an opposite direction to the direction of inclination of the optical axis "L" before the movable body 2 begins to move, the drive magnet 18 whose magnetic flux density is larger is disposed on an opposite side to the direction of inclination of the optical axis "L" when the movable body 2 begins to move.

Further, for example, in a case that magnetic flux densities generated by the respective four drive magnets 18 are substantially equal to each other, a distance between one drive magnet 18 disposed at one corner of the four corners of the lens drive device 1 and the drive coils 14 and 15 (specifically, short side parts 14b and 15b) is different from distances between the drive magnets 18 disposed at the other three corners of the four corners of the lens drive device 1 and the drive coils 14 and 15. Alternatively, distances between two drive magnets 18 disposed at two corners adjacent to each other of the four corners of the lens drive device 1 and the drive coils 14 and 15 are different from distances between remaining drive magnets 18 disposed at the other two corners of the four corners of the lens drive device 1 and the drive coils 14 and 15.

In other words, a distance between a drive magnet 18 disposed at one corner of the four corners of the lens drive device 1 and the drive coils 14 and 15 is larger or smaller than distances between the remaining drive magnets 18 disposed at the other three corners of the four corners of the lens drive device 1 and the drive coils 14 and 15. Alternatively, distances between two drive magnets 18 disposed at two corners adjacent to each other of the four corners of the lens drive device 1 and the drive coils 14 and 15 are larger or smaller than distances between the remaining drive magnets 18 disposed at the other two corners of the four corners of the lens drive device 1 and the drive coils 14 and 15. Also in these cases, on the basis of the inspection result of the inclination variation characteristic of the optical axis "L", a position or positions among the four corners of the lens drive device 1 where a distance between the drive magnet 18 and the drive coils 14 and 15 is set to be larger or smaller is determined.

For example, in order to mainly restrain a quantity of the initial tilt variation, a distance is set to be smaller between the drive magnet 18, which is disposed on a side where the optical axis "L" is inclined before the movable body 2 begins to move after supplying of an electric current to the drive coils 14 and 15 is started, and the drive coils 14 and 15. Further, in order to mainly restrain a quantity of the moving tilt variation and, in this case, when a direction where the optical axis "L" is inclined after the movable body 2 begins to move is the same as the direction of inclination of the optical axis "L" before the movable body 2 begins to move, a distance is set to be smaller between the drive magnet 18, which is disposed on a side where the optical axis "L" is inclined before the movable body 2 begins to move after supplying of an electric current to the drive coils 14 and 15 is started, and the drive coils 14 and 15. Further, in a case that a quantity of the moving tilt variation is mainly to be restrained and that a direction where the optical axis "L" is inclined after the movable body 2 begins to move is an opposite direction to the direction of inclination of the optical axis "L" before the movable body 2 begins to move, a distance is set to be smaller between the drive magnet 18, which is disposed on an opposite side to the direction of inclination of the optical axis "L" when the movable body 2 begins to move, and the drive coils 14 and 15.

As described above, even when the drive magnet 18 is disposed at each of the four corners of the lens drive device 1, a variation quantity of inclination of the optical axis "L" with respect to the fixed body 3 is restrained by means of that the magnetic flux density generated by the drive magnet 18 is changed or that the distance between the drive magnet 18 and the drive coils 14 and 15 is changed. In addition, in these cases, a driving force in the optical axis direction of the movable body 2 is increased by utilizing the magnetic fields generated by the drive magnets 18 which are disposed at the respective four corners of the lens drive device 1.

Although the present invention has been shown and described with reference to a specific embodiment, various changes and modifications will be apparent to those skilled in the art from the teachings herein.

In the embodiment described above, the drive magnet 18 is structured of two drive magnet pieces 18a and 18b. However, the present invention is not limited to this embodiment. For example, the drive magnet 18 may be structured only of the drive magnet piece 18a or only of the drive magnet piece 18b. In these cases, a driving force in the optical axis direction for the movable body 2 is increased and, in addition, a variation quantity of inclination of the optical axis "L" is restrained while reducing the size of the drive magnet 18.

In the embodiment described above, a length of the drive magnet piece 18a in the upper and lower direction is substantially equal to a length of the drive magnet piece 17a in the upper and lower direction, and a length of the drive magnet piece 18b in the upper and lower direction is substantially equal to a length of the drive magnet piece 17b in the upper and lower direction. However, the present invention is not limited to this embodiment. For example, a length of the drive magnet piece 17a in the upper and lower direction may be different from a length of the drive magnet piece 18a, and a length of the drive magnet piece 17b in the upper and lower direction may be different from a length of the drive magnet piece 18b.

In the embodiment described above, the opposed face to the drive coils 14, 15 of the drive magnet piece 18a is magnetized in the same magnetic pole as the magnetic pole of the opposed face to the drive coils 14 and 15 of the drive magnet piece 17a, and the opposed face to the drive coils 14, 15 of the drive magnet piece 18b is magnetized in the same magnetic pole as the magnetic pole of the opposed face to the drive coils 14 and 15 of the drive magnet piece 17b. However, the present invention is not limited to this embodiment. For example, the opposed face to the drive coils 14, 15 of the drive magnet piece 18a is magnetized in the same magnetic pole as the magnetic pole of the opposed face to the drive coils 14 and 15 of the drive magnet piece 17b, and the opposed face to the drive coils 14, 15 of the drive magnet piece 18b is magnetized in the same magnetic pole as the magnetic pole of the opposed face to the drive coils 14 and 15 of the drive magnet piece 17a.

In the embodiment described above, the drive magnet 18 is formed in a substantially rectangular plate shape which is a flat right-angled trapezoid shape when viewed in the optical axis direction. However, the present invention is not limited to this embodiment. For example, the drive magnet 18 may be formed in a substantially rectangular plate shape which is a flat rectangular shape when viewed in the optical axis direction. Further, the drive magnet 18 may be formed in a triangular prism shape which is a substantially triangular shape when viewed in the optical axis direction. Further, the drive magnet 18 may be formed in a polygonal pillar shape which is a polygonal shape other than a triangular shape when viewed in the optical axis direction.

In the embodiment described above, the drive magnets 17 and 18 are formed by means of that the lower end faces of the drive magnet pieces 17a and 18a are fixed to the upper end faces of the drive magnet pieces 17b and 18b in the abutted state with each other. However, the present invention is not limited to this embodiment. For example, the drive magnets 17 and 18 may be structured of the drive magnet pieces 17a and 18a and the drive magnet pieces 17b and 18b which are disposed in a separated manner from each other with a predetermined space therebetween in the optical axis direction. Further, in the embodiment described above, the drive magnets 17 and 18 are respectively formed of two drive magnet pieces, i.e., the drive magnet pieces 17a and 18a and the drive magnet pieces 17b and 18b. However, the drive magnets 17 and 18 may be formed of one drive magnet piece. In this case, one drive magnet piece is magnetized in two magnetic poles so that respective opposed faces to the drive coils 14 and 15 are magnetized in different magnetic poles from each other.

In the embodiment described above, the drive mechanism 4 is provided with two drive coils 14 and 15. However, the present invention is not limited to this embodiment. For example, the drive mechanism 4 may be provided with only one drive coil. In this case, an opposed face to the drive coil of the drive magnet 17 and an opposed face to the drive coil of the drive magnet 18 are magnetizing in one magnetic pole.

In the embodiment described above, the drive coils 14 and 15 are attached to the movable body 2 and the drive magnets 17 and 18 are attached to the fixed body 3, but the drive coils 14 and 15 may be attached to the fixed body 3 and the drive magnets 17 and 18 may be attached to the movable body 2. Further, in the embodiment described above, the lens drive device 1 is formed in a substantially square shape when viewed in the optical axis direction, but the lens drive device 1 may be formed in a substantially rectangular shape when viewed in the optical axis direction.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A lens drive device which is formed in a substantially quadrangular shape when viewed in an optical axis direction of a lens, comprising:
   a movable body which holds the lens and is movable in the optical axis direction;
   a fixed body which movably holds the movable body in the optical axis direction; and
   a drive mechanism for driving the movable body in the optical axis direction;
   wherein the drive mechanism comprises:
       first drive magnets which are respectively disposed on four side faces of the lens drive device;
       a second drive magnet for restraining inclination which is disposed on at least one of four corners of the lens drive device; and
       a drive coil which is wound around in a substantially octagonal shape when viewed in the optical axis direction and is disposed so as to face the first drive magnets and the second drive magnet; and
   wherein one of the following two is satisfied:
       magnetic flux passing through the drive coil at one corner of the four corners of the lens drive device is different from magnetic fluxes passing through the drive coil at other three corners of the four corners of the lens drive device; and
       magnetic fluxes passing through the drive coil at two corners adjacent to each other of the four corners of the lens drive device are different from magnetic fluxes passing through the drive coil at other two corners of the four corners of the lens drive device.

2. The lens drive device according to claim 1, wherein the second drive magnet is disposed at one corner, three corners or two corners adjacent to each other of the four corners of the lens drive device.

3. The lens drive device according to claim 2, wherein the second drive magnet is disposed at a position for restraining a variation amount of inclination of an optical axis of the lens with respect to the fixed body when an electric current is supplied to the drive coil.

4. The lens drive device according to claim 3, wherein the second drive magnet is disposed on a side where the optical axis is inclined when an electric current is supplied to the drive coil in the lens drive device in which the second drive magnet is not attached so that a driving force in the optical axis direction on an inclined side is increased to restrain inclination of the optical axis.

5. The lens drive device according to claim 1, wherein
   the drive coil is comprised of a first drive coil and a second drive coil which are attached to the movable body in a separated state from each other with a predetermined space therebetween and overlapped with each other in the optical axis direction,
   the first drive magnet is comprised of a first magnet part and a second magnet part which are disposed to overlap with each other in the optical axis direction and whose opposed faces to the drive coil are magnetized in different magnetic poles from each other,
   the second drive magnet is comprised of a third magnet part and a fourth magnet part which are disposed to overlap with each other in the optical axis direction and whose opposed faces to the drive coil are magnetized in different magnetic poles from each other,
   lengths in the optical axis direction of the first magnet part and the third magnet part are substantially same as each other and the first magnet part and the third magnet part are disposed at substantially same position as each other in the optical axis direction, lengths in the optical axis direction of the second magnet part and the fourth magnet part are substantially same as each other and the second magnet part and the fourth magnet part are disposed at substantially same position as each other in the optical axis direction, and an opposed face to the drive coil of the first magnet part and an opposed face to the drive coil of the third magnet part are magnetized in same magnetic pole as each other, and an opposed face to the drive coil of the second magnet part and an opposed face to the drive coil of the fourth magnet part are magnetized in same magnetic pole as each other.

6. The lens drive device according to claim 1, wherein the drive coil is comprised of a first drive coil and a second drive coil which are attached to the movable body in a separated state from each other with a predetermined space therebetween and overlapped with each other in the optical axis direction, the first drive magnet is comprised of a first magnet part and a second magnet part which are disposed to overlap with each other in the optical axis direction and whose opposed faces to the drive coil are magnetized in different magnetic poles from each other, and one of following two is satisfied:

a length of the second drive magnet is substantially same as a length of the first magnet part in the optical axis direction and the second drive magnet is disposed at substantially same position as the first magnet part in the optical axis direction, and an opposed face to the drive coil of the second drive magnet is magnetized in same magnetic pole as an opposed face to the drive coil of the first magnet part, and a length of the second drive magnet is substantially same as a length of the second magnet part in the optical axis direction and the second drive magnet is disposed at substantially same position as the second magnet part in the optical axis direction, and an opposed face to the drive coil of the second drive magnet is magnetized in same magnetic pole as an opposed face to the drive coil of the second magnet part.

7. The lens drive device according to claim 1, wherein the second drive magnet is disposed at each of the four corners of the lens drive device, and one of following two is satisfied:

magnetic flux passing through the drive coil which is generated from the second drive magnet disposed at one corner of the four corners of the lens drive device is different from magnetic fluxes passing through the drive coil which are generated from remaining second drive magnets disposed at other three corners of the four corners of the lens drive device, and magnetic fluxes passing through the drive coil which are generated from the second drive magnets disposed at two corners adjacent to each other of the four corners of the lens drive device are different from magnetic fluxes passing through the drive coil which are generated from remaining second drive magnets disposed at other two corners of the four corners of the lens drive device.

8. The lens drive device according to claim 7, wherein the second drive magnets are disposed so that the magnetic flux passing through the drive coil becomes larger on a side where the optical axis is inclined when an electric current is supplied to the drive coil in the lens drive device in which the second drive magnet is not attached.

9. The lens drive device according to claim 7, wherein one of following two is satisfied and thus magnetic flux densities applied to the drive coil are different:

magnetic flux density generated by the second drive magnet which is disposed at one corner of the four corners of the lens drive device is different from magnetic flux densities generated by remaining second drive magnets which are disposed at other three corners of the four corners of the lens drive device, and magnetic flux densities generated by two second drive magnets which are disposed at two corners of the four corners of the lens drive device are different from magnetic flux densities generated by remaining second drive magnets which are disposed at other two corners of the four corners of the lens drive device.

10. The lens drive device according to claim 9, wherein the second drive magnet whose magnetic flux density is larger is disposed on a side where the optical axis is inclined when an electric current is supplied to the drive coil in the lens drive device in which the second drive magnet is not attached and, as a result, a driving force in the optical axis direction on an inclined side is increased to restrain inclination of the optical axis.

11. The lens drive device according to claim 9, wherein the drive coil is comprised of a first drive coil and a second drive coil which are attached to the movable body in a separated state from each other with a predetermined space therebetween and overlapped with each other in the optical axis direction, the first drive magnet is comprised of a first magnet part and a second magnet part which are disposed to overlap with each other in the optical axis direction and whose opposed faces to the drive coil are magnetized in different magnetic poles from each other, the second drive magnet is comprised of a third magnet part and a fourth magnet part which are disposed to overlap with each other in the optical axis direction and whose opposed faces to the drive coil are magnetized in different magnetic poles from each other, lengths in the optical axis direction of the first magnet part and the third magnet part are substantially same as each other and the first magnet part and the third magnet part are disposed at substantially same position as each other in the optical axis direction, lengths in the optical axis direction of the second magnet part and the fourth magnet part are substantially same as each other and the second magnet part and the fourth magnet part are disposed at substantially same position as each other in the optical axis direction, and an opposed face to the drive coil of the first magnet part and an opposed face to the drive coil of the third magnet part are magnetized in same magnetic pole as each other, and an opposed face to the drive coil of the second magnet part and an opposed face to the drive coil of the fourth magnet part are magnetized in same magnetic pole as each other.

12. The lens drive device according to claim 9, wherein the drive coil is comprised of a first drive coil and a second drive coil which are attached to the movable body in a separated state from each other with a predetermined space therebetween and overlapped with each other in the optical axis direction, the first drive magnet is comprised of a first magnet part and a second magnet part which are disposed to overlap with each other in the optical axis direction and whose opposed faces to the drive coil are magnetized in different magnetic poles from each other, and
one of following two is satisfied:
  a length of the second drive magnet is substantially same as a length of the first magnet part in the optical axis direction and the second drive magnet is disposed at substantially same position as the first magnet part in the optical axis direction, and an opposed face to the drive coil of the second drive magnet is magnetized in same magnetic pole as an opposed face to the drive coil of the first magnet part, and
  a length of the second drive magnet is substantially same as a length of the second magnet part in the optical axis direction and the second drive magnet is disposed at substantially same position as the second magnet part in the optical axis direction, and an opposed face to the drive coil of the second drive magnet is magnetized in same magnetic pole as an opposed face to the drive coil of the second magnet part.

13. The lens drive device according to claim 7, wherein
one of following two is satisfied and thus magnetic flux densities applied to the drive coil are different;
  a distance between the second drive magnet which is disposed at one corner of the four corners of the lens drive device and the drive coil is different from distances between remaining second drive magnets which are disposed at other three corners of the four corners of the lens drive device, and
  distances between the second drive magnets which are disposed at two corners adjacent to each other of the four corners of the lens drive device and the drive coil are different from distances between remaining second drive magnets which are disposed at other two corners of the four corners of the lens drive device.

14. The lens drive device according to claim 13, wherein the second drive magnet whose distance to the drive coil is nearer is disposed on a side where the optical axis is inclined when an electric current is supplied to the drive coil in the lens drive device in which the second drive magnet is not attached and, as a result, a driving force in the optical axis direction on an inclined side is increased to restrain inclination of the optical axis.

15. The lens drive device according to claim 13, wherein
  the drive coil is comprised of a first drive coil and a second drive coil which are attached to the movable body in a separated state from each other with a predetermined space therebetween and overlapped with each other in the optical axis direction,
  the first drive magnet is comprised of a first magnet part and a second magnet part which are disposed to overlap with each other in the optical axis direction and whose opposed faces to the drive coil are magnetized in different magnetic poles from each other,
  the second drive magnet is comprised of a third magnet part and a fourth magnet part which are disposed to overlap with each other in the optical axis direction and whose opposed faces to the drive coil are magnetized in different magnetic poles from each other,
  lengths in the optical axis direction of the first magnet part and the third magnet part are substantially same as each other and the first magnet part and the third magnet part are disposed at substantially same position as each other in the optical axis direction,
  lengths in the optical axis direction of the second magnet part and the fourth magnet part are substantially same as each other and the second magnet part and the fourth magnet part are disposed at substantially same position as each other in the optical axis direction, and
  an opposed face to the drive coil of the first magnet part and an opposed face to the drive coil of the third magnet part are magnetized in same magnetic pole as each other, and an opposed face to the drive coil of the second magnet part and an opposed face to the drive coil of the fourth magnet part are magnetized in same magnetic pole as each other.

16. The lens drive device according to claim 13, wherein
  the drive coil is comprised of a first drive coil and a second drive coil which are attached to the movable body in a separated state from each other with a predetermined space therebetween and overlapped with each other in the optical axis direction,
  the first drive magnet is comprised of a first magnet part and a second magnet part which are disposed to overlap with each other in the optical axis direction and whose opposed faces to the drive coil are magnetized in different magnetic poles from each other, and
  one of following two is satisfied:
    a length of the second drive magnet is substantially same as a length of the first magnet part in the optical axis direction and the second drive magnet is disposed at substantially same position as the first magnet part in the optical axis direction, and an opposed face to the drive coil of the second drive magnet is magnetized in same magnetic pole as an opposed face to the drive coil of the first magnet part, and
    a length of the second drive magnet is substantially same as a length of the second magnet part in the optical axis direction and the second drive magnet is disposed at substantially same position as the second magnet part in the optical axis direction, and an opposed face to the drive coil of the second drive magnet is magnetized in same magnetic pole as an opposed face to the drive coil of the second magnet part.

* * * * *